3,341,481
PREPARATION OF CELLULAR POLYOLEFINS
David A. Palmer, Wilmington, Del., assignor to Hercules Incorporated, a corporation of Delaware
No Drawing. Filed July 2, 1964, Ser. No. 380,068
14 Claims. (Cl. 260—2.5)

This application is a continuation-in-part of my application, U.S. Serial No. 304,977, filed August 27, 1963 and now abandoned.

This invention relates to a process of preparing cellular products from thermoplastic polymers and more particularly to a process of preparing a thermoplastic polymer foam of fine celled, uniform structure and low density.

Many processes have been used for the preparation of articles from foamed polymers, particularly of polystyrene. One of the most common procedures is that wherein beads, granules, etc., of a polymer, such as polystyrene, containing a volatile liquid blowing agent are pre-expanded, then placed in the mold and heated with steam to further expand the beads, fuse them together and fill the mold. This procedure has many disadvantages and in fact is not adaptable to, for example, the higher melting polypropylene, because of the difficulty of welding the particles together without collapse of the foam. Consequently, when such a process is used, the welds are often imperfect and also are subject to fracture at the weld seam. Another process that has been used is the thermoforming of an extruded, foamed sheet of polystyrene, but this method is of greatly limited use due to the fact that the cold, foamed sheet must be ⅛ inch or less in thickness because of the critical heating cycle that is required.

Now in accordance with this invention, it has been found that cellular thermoplastic polymers can readily be produced by heating under pressure, as for example in a closed mold, a composition comprising the thermoplastic polymer, a blowing agent, and an azido cross-linking agent, to a temperature above the softening point of the composition and sufficient to release the gas from the blowing agent and to effect the azido modification of the polymer, releasing the pressure, as by opening the mold, allowing the composition to expand in three dimensions, and then while still hot, thermoforming or otherwise shaping the foam into the desired shape.

The process of this invention makes it possible to prepare and, if desired, thermoform thick sheets of foam on rapid cycles, thus overcoming both the thickness limitation and the critical heating cycles required with other materials. The present process permits rapid and uniform heating by keeping the foamable composition under compression during the heating cycle, since, under compression, foaming cannot take place and, accordingly, heat transfer rates are uniform and high. Furthermore, more uniform foams are obtained since foaming is suppressed until the composition is uniformly heated. When the pressure is released, expansion takes place, which expansion is surprisingly a three-dimensional expansion, the foam retaining the shape of the mold. Because the azido modification of the polymer is effected just prior to or simultaneously with expansion, in the process of this invention, the foam has adequate stability to permit its being easily handled without collapsing and the foam can be transferred to a forming or molding device and formed while it is still hot or cooled between parallel plates to yield a flat sheet, etc.

Any thermoplastic polymer can be foamed and shaped by the process of this invention. Exemplary of the thermoplastic polymers which can be so foamed are polyolefins such as high and low density polyethylene, stereoregular polypropylene, ethylene-propylene copolymers, particularly the at least partially crystalline polymers which generally contain at least about 80% ethylene, ethylene-vinyl acetate copolymers, ethylene-acrylate copolymers, polystyrene, acrylonitrile-butadiene-styrene terpolymers, and blends of any of these polymers, polyvinyl chloride, both rigid and plasticized, etc. For many applications, it is desirable to increase the flexibility of the final article by adding an elastomeric hydrocarbon polymer to the blend of thermoplastic polymer, cross-linking agent, and blowing agent, and then processing by the invention. The amount of the elastomeric polyolefin incorporated can vary over a wide range, but generally will be about 50% or less by weight of the thermoplastic polymer. Exemplary of the elastomeric hydrocarbon polymers that can be so incorporated are polyisobutylene, butyl rubber (a polyisobutylene which contains a relatively small amount of unsaturation), ethylene-propylene copolymer rubbers, (i.e., amorphous copolymers), ethylene-propylene-diene terpolymer rubbers, etc. Exemplary of the dienes in the latter terpolymers are dicyclopentadiene, butadiene, isoprene, norbornene, 5-methyl-2-norbornene, 1,4-hexadiene, 6-methyl-1,5-heptadiene, etc.

Any of the well-known chemical blowing agents can be used in the preparation of the foamed articles in accordance with this invention as, for example, azobis(formamide), diazoaminobenzene, N,N'-dinitrosopentamethylene tetramine, N,N'-dimethyl-N,N'-dinitrosoterephthalamide, p,p'-oxy-bis(benzene sulfonyl semi-carbazide), azobis(isobutyronitrile), p,p'-oxy-bis(benzene sulfonyl hydrazide), p,p'-diphenyl-bis(sulfonyl hydrazide), benzenesulfonyl hydradize, m-benzene-bis(sulfonyl hydrazide), etc. Any of the well-known solvent blowing agents may also be used in this invention as, for example, methyl chloride, methylene chloride, monochlorotrifluoromethane, dichlorotetrafluoroethylene, trichloroethylene, chloroform, carbon tetrachloride, and low boiling hydrocarbons such as butane, pentane, hexane, etc. Accordingly, any compound which decomposes or volatilizes to yield at lease one mole of gas per mole of blowing agent at a temperature of 190° C. or less may be used.

Any azido cross-linking agent can be used in the preparation of the foamed articles in accordance with this invention. Thus, any poly(sulfonazide), i.e., any compound having the general formula

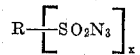

where R is an organic radical inert to the cross-linking reaction and $x$ is an integer greater than 1, can be used in the process of this invention. Preferably, $x$ will be an integer from 2 to 100 and R will be selected from the group of organic radicals consisting of alkylene, arylene, aralkylene, and alkarylene radicals; however, these radicals can also contain ether, alcohol, halogen, etc., groups which are inert to the cross-linking reaction. Exemplary of the poly(sulfonazide)s that may be used are 1,7-heptane-bis(sulfonazide), 1,10 - decane-bis(sulfonazide), 1,11-undecane-bis(sulfonazide), 1,12 - dodecane-bis(sulfonazide), 7-oxa-tridecane-1,13-bis(sulfonazide), 6-thia-undecane - 1,11 - bis(sulfonazide); chloroaliphatic poly (sulfonazide)s such as the poly(sulfonazide) produced from a chloro- and sulfochlorinated mixture of petroleum hydrocarbons containing at least one chlorine atom and at least two sulfonazide groups per molecule; 1,9,18-octadecane-tris(sulfonazide) poly(ethylene sulfonazide), poly sulfonazido-methyl styrene), 1,3- and 1,4-bis(sulfonazidomethyl benzene), 1,3-benzene bis(sulfonazide), 1-octyl-2,4,6-benzene tris(sulfonazide), 4,4'-diphenylmethane bis (sulfonazide), 4,4'-diphenyl ether bis(sulfonazide), 4,4'-bis-octadecyl biphenyl-3,5,3',5'-tetra(sulfonazide) 4,4'-diphenyl disulfide bis(sulfonazide), 1,6-bis(4'-sulfonazidophenyl) hexane, 2,7-naphthalene bis(sulfonazide), etc. Another class of azido cross-linking agents that can be used are azidoformates which have the general formula

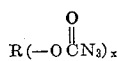

$$R(-O\overset{O}{\underset{\|}{C}}N_3)_x$$

where $x$ is at least 1, preferably from about 1 to about 100, and R is an organic radical, inert to cross-linking reactions, containing at least one carbon atom per azidoformate group. Exemplary of these azidoformates are the alkyl azidoformates such as n-octadecyl azidoformate, tetramethylene - bis(azidoformate), pentamethylene - bis(azidoformate); the cyclic alkyl azidoformates such as 2-(1-p-methenyl-8-oxy) ethyl azidoformate; the aromatic azidoformate such as phenyl azidoformate, α,α'-p-xylylene-bis(azidoformate), 2,2-isopropylidene-bis(p,p'-phenyl azidoformate); the azidoformate ethers such as 2,2'-oxydiethyl-bis(azidoformate), 2,2' - oxydipropyl - bis(azidoformate), 2,2' - ethylenedioxydiethyl-bis(azidoformate), the tetraazidoformate of pentaerythritol-propylene oxide adduct, the azidoformate thioethers such as 2,2'-thiodiethyl-bis(azidoformate), 4,4'-thiodibutyl-bis(azidoformate); etc. Still another class of azido cross-linking agents that can be used are the aromatic polyazides having the general formula $R(N_3)_x$ where R is an aromatic grouping inert to the cross-linking reaction, and $x$ is an integer greater than 1. Preferably $x$ will be an integer from 2 to 200 and R will be selected from the group of organic radicals consisting of arylene and alkarylene radicals. Exemplary of the aromatic polyazides useful in this invention are m-phenylene diazide, 2,4,6-triazido-benzene, 4,4'-diphenyl diazide, 4,4'-diphenylmethane diazide, 4,4'-diazide diphenyl amine, 4,4'-diazido diphenylsulfone, 2,7-diazidonaphthalene and 2,6-diazide-anthraquinone. Thus, any compound having at least one azido group in the molecule and preferably two or more can be used as the azido cross-linking agent to prepare the foams in accordance with this invention.

The amount of the azido cross-linking agent utilized can be varied over a wide range and will depend upon the type of azido cross-linking agent used, the polymer being foamed, the properties desired in the final foam, etc. It must be an amount that is sufficient to prevent rupture of the cell walls when the foaming action takes place and at the same time prevent sagging of the hot foamed sheet so that it can be processed, as for example, thermoformed, etc. Generally, it will be an amount of from about 0.01% up to about 10% or more, preferably from about 0.1% to about 5% and more preferably from about 0.1% to about 2% by weight of the polymer. Depending upon the amount and type of azido cross-linking agent used, actual cross-linking of the polymer may or may not occur. Thus, for example, at low levels of polysulfonazides, particularly those of high molecular weight, there will be an insufficient amount to achieve actual cross-linking (insolubilization of the polymer), yet the polymer will be modified to such an extent that collapse of the cell walls is prevented, which collapse would occur if no azido cross-linking agent were used. Larger amounts of the azido cross-linking agent will be used when a cross-linked, foamed product is desired. The amount of blowing agent incorporated will obviously depend upon the degree of blowing desired; that is, the density desired for the final foamed product and the types of blowing agent used. The process of this invention is of particular importance in the production of articles of foamed polyolefins.

As pointed out above, the composition which is heated to produce the cellular thermoplastic polymer which can then be thermoformed or otherwise shaped, is a mixture or blend of the polymer, azido cross-linking agent and blowing agent. Any desired means can be used in mixing or blending these components. In the case of the chemical blowing agents, the azido cross-linking agent and the blowing agent may be mixed into a diluent such as acetone, which may also contain a stabilizer or other modifier for the polymer, and the polymer in finely divided form may then be added and mixed into a slurry. On evaporation of the diluent an intimate mixture of the polymer, cross-linking agent and blowing agent is obtained which may then be used directly in the mold. The azido cross-linking agent and the chemical blowing agent may also be blended in dry form with the powdered polymer by means of a high-speed mixer such as a Waring Blendor or Henschel mill. This dry mix may then be used directly in the mold. When solvent types of blowing agents are employed, the polymer and azido cross-linking agent can be blended by any desired means and formed into pellets, strips, etc., which can then be soaked in the volatile blowing agent and used. Obviously, many other variations can be made in the method of blending or mixing this three-component composition. In addition, additives, such as light and heat stabilizers, dyestuffs and pigments, flame retardants, including organic and inorganic flame retardants, such as chlorinated paraffin wax, antimony oxide and other such materials, cell nucleating agents, etc., can be incorporated in the composition that is foamed.

The temperature and length of the heating cycle will depend on the thermoplastic polymer or elastomer blend thereof being foamed, the azido cross-linking agent used, and the blowing agent used. In general, it will be a temperature above the softening point of the composition and sufficient to release the gas from the blowing agent and to effect the azido modification of the polymer. The softening temperature of the blend will depend upon whether the blowing agent is a solvent type or a chemical type. Thus, with a solvent type blowing agent, the polymer will at least partially dissolve so that the softening temperature of the blend can be as low as 135° C. On the other hand, with a chemical blowing agent, the softening temperature of the blend will be the melting point of the polymer. Accordingly, the cross-linking and blowing temperature will be from the softening temperature up to about 275° C. The period of time required will depend on the temperature used, the specimen thickness, etc., but usually will be about 1 to about 15 minutes.

The expansion of the expandable composition which takes place on reducing the pressure after the heating cycle may be carried out in a single or multiple stage pressure reduction process. Thus, if the composition is heated in a mold under pressure, expansion takes place in all three dimensions when the mold is opened and the cellular product will have the same general shape and configuration as the mold in which the expandable composition was heated. This cellular product can then be cooled in that shape or it can be thermoformed, while still hot, into any desired shape. As pointed out above, the polymer is modified by the azido cross-linking agent in this process, just prior to or simultaneously with the expansion, hence if the foam is to be thermoformed, this operation can be carried out immediately and prior to any substantial cooling of the foam. In the same way, if the reduction of pressure, after the heating cycle is carried out in more than one stage, the time lapse and drop in temperature is preferably held at a minimum. The heating cycle can be carried out in a compression mold, extruder, or other means. In the case of the mold, the pressure is reduced by the sudden opening of the mold. In the case of an extruder, the composition heated in the extruder to the desired temperature can be extruded onto a belt at atmospheric pressure to allow expansion.

There are many advantages in carrying out the reduction in pressure on the heated expandable composition in multiple stages. A much smaller mold can be used for the compression heating cycle than could otherwise be used for a given density of foam. Also, for a given size mold, smaller amounts of blowing agent are required for a given density of foam. This reduction in pressure in stages is readily carried out by first reducing the pressure after the heating cycle to atmospheric pressure and, then while still hot, further reducing the pressure to subatmospheric pressure by applying a vacuum. For example, the mixture of polymer, azido cross-linking agent and blowing agent can be heated in a closed mold under pressure and after the desired temperature is reached, suddenly releasing the pressure by opening the mold. The foam, which has expanded in all three dimensions, can then be immediately placed in a vacuum chamber and the pressure further reduced to further expand the foam. In this second stage of expansion, the foam can at the same time be shaped to the desired form. The latter operation can be achieved by placing the foam, after the first stage of expansion, into a wire cage, cloth sack, or other shaping container of the desired form, or between platens, etc., and then placing the assembly in a vacuum chamber and reducing the pressure until the foam fills the container, or otherwise assumes the desired shape, after which it is cooled. Obviously, the expansion in this second stage can be operated as a one-, two-, or three-dimensional expansion, as desired, to produce the type and shape wanted in the final cellular product. Hence, the operation is very flexible and enables the production of articles having essentially the same cell size throughout, or small cell size in one portion with larger cell size in another, longer cells in one direction, etc. Many other variations will be apparent to those skilled in the art.

Foamed articles produced by the process of this invention have tough, smooth, closed surface skins which may, if desired, be backed by a layer of cells slightly larger than those at the center of the foam. This layer increases the stiffness of the skin. The depth of the coarse foam layer can be increased by increasing the heating time in the press. In cases where the coarse cell layer is undesirable, i.e., where a less stiff skin is desired, the layer can be reduced by shortening the heating time. It can be completely eliminated and fine cells obtained in this layer by including a finely divided pigment as a nucleating agent. The process of this invention is particularly outstanding for the production of foams with fine, uniform, closed cells, the cells of which foams will vary from less than 0.001 inch to 0.025 inch.

The following examples will illustrate the process of this invention. All parts and percentages are by weight unless otherwise indicated.

Example 1–3

In Example 1 and the control, preforms of the polymer, azido cross-linking agent (DSA, i.e. decamethylene disulfonylazide) and blowing agent compositions were formed by adding to 100 parts of acetone, 0.20 part of the stabilizer known as Santonox [4,4′-thiobis(6-tert-butyl-m-cresol)], varying concentrations of the azido cross-linking agent and varying concentrations of azobis(formamide) as blowing agent. These acetone mixtures were vigorously stirred, poured over 100 parts of the finely divided polypropylene and mixed into a slurry. With occasional stirring the solvent was evaporated, leaving an intimate mixture of polymer, stabilizer, cross-linking agent, and blowing agent. The mixtures were each then placed on a 6 x 16 inch, two-roll mill at 168° C. and compounded for 7–10 minutes with repeated cross-cutting and end-rolling. When thoroughly milled, the hot plastic was removed from the mill in the form of a ⅛ inch thick sheet. The milled sheets were cut into sizes to yield the weight required to fill preform picture-frame molds of definite dimensions. Preforms were prepared by placing the cut pieces in these molds at 177° C. for 4 minutes without pressure, followed by 2 minutes at 600 p.s.i. Theye were then cooled under pressure.

In Examples 2 and 3, the blend of polypropylene, elastomer, azido cross-linking agent (DSA) and azobis(formamide) as blowing agent was compounded directly on a two-roll mill without the previous solvent slurry step, removed from the mill, and cooled with Dry Ice, chopped into pellets and then placed in the mold without molding into a preform.

Compounded pellets or preformed sheets, cut to the mold dimensions shown in Table I, were placed in the mold between chromed platens and the entire assembly was put in a heated hydraulic press, which was then tightly closed. At the completion of the heating time, the press was opened rapidly, permitting the foam to expand out of the mold.

Tabulated below is the polymer or blend of polymers used, the amount of blowing agent and cross-linking agent, mold dimensions and temperature and heating period, along with the size of the foamed sheet produced, density of the foam and description thereof.

The expanded sheets possessed excellent form stability at the foaming temperature in every case, in sharp contrast to the control where an attempt was made to produce a polypropylene foam under identical conditions but without incorporating a cross-linking agent. After formation of the foams, they were removed from the press and placed between cooling platens at a pressure of 1 to 2 p.s.i.

The abbreviation RSV in these and the following examples is used to denote the reduced specific viscosity of the polymer as measured on a 0.1% solution of the polymer in decahydronaphthalene at 135° C.

TABLE I

| Example Number | Thermoplastic | Parts Azobis-form-amide | Cross-Linking Agent | | Mold Dimensions (inches) | Press Conditions | | Dimensions of Foam (inches) | Results | Density (lb./cu. ft.) |
| --- | --- | --- | --- | --- | --- | --- | --- | --- | --- | --- |
| | | | Type | Parts | | Temp. (° C.) | Heating Time (min.) | | | |
| Control | Polypropylene (RSV 3.2). | 3.0 | | 0 | 4 x 4 x ⅛ | 235 | 1½ | (1) | | |
| 1 | ___do___ | 3.0 | DSA | 0.75 | 4 x 4 x ⅛ | 235 | 1½ | 6 x 6 x ½ | Fine cells <0.001 to 0.008″. Very uniform structure. | 7.5 |
| 2 | Polypropylene (RSV 3.2) 75%, Ethylene–Propylene Rubber (RSV 2.1) 25%, Propylene—32 mole percent. | 5.0 | DSA | 1.5 | 6 x 6 x ⅛ | 225 | 1 | 10 x 10 x ½ | Fine cells <0.001 to .005″. Very uniform structure. | 4.5 |
| 3 | Polypropylene (RSV 3.2) 75%, Polyisobutylene 25%. | 5.0 | DSA | 1.5 | 6 x 6 x ⅛ | 225 | 1 | 10 x 10 x ½ | ___do___ | 5.0 |

[1] No foam obtained. Material in mold was a sticky mass.
DSA—Decamethylene disulfonylazide.

Examples 4–6

Examples 1–3 were exactly repeated except that after each foam sheet was prepared, it was immediately taken out of the press and placed between matching metal cup molds, thermoformed by application of pressure, and then permitted to cool. In each case the foam conformed exactly to the mold cavity, producing a fine-celled, foamed plastic cup. This operation was not possible in the polyproylene control example, since without the cross-linking agent, the sheet was too sticky and soft to handle.

Example 7

A mixture of 100 parts of stereoregular polypropylene having an RSV of 4.2, 0.2 part of Santonox and 0.05 part of calcium silicate (as a cell nucleator) were dry blended and then extruded at 216° C. and the extrudate was chopped into ⅛-inch molding pellets. The molding pellets were soaked, at 35° C., in a mixture of 0.2 part of tetramethylene bis azidoformate and 4.8 parts of methylene chloride until a weight gain of 6% was observed. The pellets were then exposed to air until their surfaces were dry. Sixty parts of these pellets were then placed in a 6″ x 6″ x ⅛″ mold which was closed tightly in a hydraulic press heated to 160° C. After a heating period of 3 minutes, the press was opened permitting the foam to expand out of the mold. After cooling, the foam was found to have a density of 10 lbs./cu. ft. and a uniform cell structure, all cell dimensions of which were 0.030 to 0.090 inch.

When this example was repeated, except that the tetramethylene bis azidoformate was omitted, only a sticky mass was obtained instead of a foam.

Examples 8–10

Preformed sheets were prepared by the procedure described in Example 1 using 0.5 part of decamethylene disulfonylazide and 2.3 parts of azobis(formamide) per 100 parts of polypropylene (RSV of 3.2).

In Example 8 the preformed sheet was placed in a mold and heated under pressure exactly as described in Example 1. The foam so prepared had a density of 9.8 lbs./cu. ft.

The process of Example 8 was exactly duplicated in Example 9 except that instead of cooling the foam between cooling platens at a pressure of 1 to 2 p.s.i. as was done there, the foam, produced on releasing the pressure by opening the mold and having a density of about 10 lbs./cu. ft., was immediately placed in a vacuum chamber and the pressure was reduced to 7 inches of mercury, whereby the foam expanded further. The density of the final foam so produced was 2.5 lbs./cu. ft.

In Example 10, the process of Example 9 was repeated except that the foam obtained on opening the mold was immediately placed in a wire mesh restraining cage, which was then placed in the vacuum chamber and the foam was expanded to the confines of the cage when the pressure was reduced. The shaped foam article so obtained had a density of 3.8 lbs./cu. ft.

Examples 11 and 12

Examples 8 and 9 were repeated except that the preforms were prepared from a composition made up of 100 parts of polypropylene (RSV of 3.2), 0.5 part of decamethylene disulfonylazide, and 0.20 part of azobis-(formamide).

The foam produced in Example 11 on opening the mold and cooling between platens as described in Examples 1 and 8 had a density of 41 lbs./cu. ft.

The foam produced in Example 12 was expanded in the first reduction of pressure to a density of about 40 lbs./cu. ft. and when further immediately expanded under vacuum (while still hot) had a final density of 14 lbs./cu. ft.

Examples 13–24

In each of these examples a mixture of 100 parts of the thermoplastic polymer, or blend thereof, a given amount of the blowing agent azobis(formamide), and 0.5 part of Santonox was two-roll milled for 8 minutes at 170° C., at which time a given amount of the azido cross-linking agent was added on the mill and the mixture was thoroughly worked for 3.5 minutes. The mixture was then removed and allowed to cool to room temperature. An amount of the mixture, calculated to fill 90% of the volume of a 5 x 5 x ¼ inch mold, was placed in the mold and subjected to 1200 p.s.i. and 215° C. for 4.5 minutes. The press was then opened to suddenly release the pressure and the material expanded to yield the foam.

Tabulated below is the polymer or blend of polymers used, the amount of blowing agent and cross-linking agent, and the properties of the foam produced. The cross-linking agents are designated in the table as follows: DSA—Decamethylene disulfonylazide; DDSA—Dodecamethylene disulfonylazide; DPSA—4,4′-diphenyl disulfonylazide; KSA—a chloropoly(sulfonazide) prepared from a commercial mixture of hydrocarbons having 11–12 carbon atoms per molecule and containing an average of 8% chlorine and 2 sulfonazide groups per molecule.

TABLE II

| Example | Thermoplastic | Parts Azobis-formamide | Cross-Linking Agent Type | Cross-Linking Agent Parts | Dimensions of Foam (inches) | Density (lb./cu. ft.) |
|---|---|---|---|---|---|---|
| Control | Polyethylene (Density 0.962) | 6 | | 0 | No foam produced | |
| 13 | do | 6 | DSA | 0.5 | 11 x 11 x 0.52 | 5 |
| 14 | do | 2.8 | DSA | 0.5 | 9 x 9 x 0.48 | 10 |
| 15 | Polyethylene (Density 0.945) | 6 | DSA | 0.5 | 11 x 11 x 0.50 | 5 |
| 16 | Polyethylene (Density 0.962) | 6 | DDSA | 0.75 | 10.8 x 10.8 x 0.50 | 5.5 |
| 17 | do | 6 | DPSA | 0.5 | 10 x 10 x 0.5 | 7 |
| 18 | do | 2.8 | KSA | 0.75 | 8.5 x 8.5 x 0.45 | 10 |
| 19 | Polyethylene 75% (Density 0.962), Polypropylene 25% (RSV 3.2) | 6 | DSA | 0.5 | 10.5 x 10.5 x 0.5 | 6 |
| 20 | Polyethylene 50%, Polypropylene 50% | 6 | DSA | 0.5 | 10.5 x 10.5 x 0.5 | 6 |
| 21 | Polyethylene 25%, Polypropylene 75% | 6 | DSA | 0.5 | 10.5 x 10.5 x 0.5 | 6 |
| 22 | Polyethylene 75% (Density 0.962), Polyisobutylene 25% | 6 | DSA | 0.5 | 10.5 x 10.5 x 0.5 | 6 |
| 23 | Polystyrene (mol. wt. 150,000) | 2 | DPSA | 0.5 | 9 x 9 x 0.44 | 11 |
| 24 | Ethylene–propylene Copolymer (9 mole percent propylene; RSV 2.1) | 3 | DSA | 0.5 | 10 x 10 x 0.48 | 7.5 |

In each case the foam had a fine uniform, closed cell structure, the cell size of the foams in Examples 13–23 being 1–20 mils and the cells of the foam of Example 24 being 5–15 mils in size. The foams produced in Examples 19–21 had increased hardness and stiffness as the concentration of polypropylene was increased, the foam of Example 19 having a compressive strength of 49 p.s.i. and modulus of 1800 p.s.i., the foam of Example 20 having a compressive strength of 64 p.s.i. and modulus of 2700 p.s.i., and that of Example 21 having a compressive strength of 75 p.s.i. and modulus of 2800 p.s.i. The foam produced in Example 22 was more elastic than the foam produced from polyethylene alone (Example 13) and had a tensile modulus of 4300 p.s.i.

*Example 25*

A mixture of 100 parts of poly(vinyl chloride), 5 parts of azobis(formamide), 6 parts of dibasic lead phthalate, 10 parts of epoxidized soybean oil (mol. wt. about 1000) as plasticizer, and 0.5 part of decamethylene disulfonylazide were worked on a two-roll mill for 6 minutes at 170° C. The mixture was removed and after allowing to cool to room temperature, 90 parts of the mixture was placed in a 6 x 6 x ⅛ inch mold under about 1200 p.s.i. pressure for 4 minutes at 215° C. The press was then opened to suddenly release the pressure. The yellow foamed product was then cold formed to ¼ inch thickness. The foamed sheet so produced had a fine uniform cell structure and a density of 18 lbs./cu. ft.

As may be seen from the foregoing examples, the process of this invention makes it possible to produce thermoplastic cellular articles by a process that is not only commercially feasible but also is economical. Very rapid foaming and thermoforming cycles are possible and only small presses are required since the finished foam sheet or other shaped article is much larger than the press capacity, etc.

The process of this invention can be used in the manufacture of any flat or molded foam article as, for example, wall panels, bouyant devices, shipping crates and boxes, insulated containers, padded seating, resilient headliners and door panels for automobiles, etc. Designs, printing, etc., can be pressed into the smooth skin of the foam and articles can be prepared having high density sections and low density sections all in a single operation. Many other variations can obviously be made in the preparation of the final cellular product.

What I claim and desire to protect by Letters Patent is:

1. A process for preparing cellular thermoplastic polymers which comprises
    (1) heating in a closed mold a preformed composition comprising
        (a) a thermoplastic polymer selected from the group consisting of polyethylene, polypropylene, ethylene-propylene copolymers, ethylene-vinyl acetate copolymers, ethylene-alkyl acrylate copolymers, polystyrene, acrylonitrile-butadiene-styrene terpolymers, and polyvinyl chloride,
        (b) an azido cross-linking agent which decomposes at a temperature within the range of from the softening temperature of the composition to about 275° C.,
        (c) a blowing agent which yields at least one mole of gas per mole of blowing agent at a temperature within the range of from the softening temperature of the composition to about 275° C., said composition being heated to a temperature above the softening point of said composition and sufficient to release the gas from said blowing agent and to effect azido modification of said polymer, and
    (2) reducing the pressure on the composition by opening the mold to allow free expansion at atmospheric pressure of the composition in all directions to retain essentially the preformed shape.

2. The process of claim 1 wherein the thermoplastic polymer is polypropylene.

3. The process of claim 1 wherein the thermoplastic polymer is polyethylene.

4. The process of claim 1 wherein the thermoplastic polymer is polystyrene.

5. The process of claim 1 wherein the thermoplastic polymer is poly(vinyl chloride).

6. The process of claim 1 wherein the thermoplastic polymer is an ethylene-propylene copolymer.

7. The process of claim 1 wherein the composition heated under pressure comprises a mixture of thermoplastic polymer, an elastomeric polyolefin, an azido cross-linking agent and a blowing agent, said elastomeric polyolefin being selected from the group consisting of polyisobutylene, butyl rubber, ethylene-propylene copolymer rubber, and ethylene-propylene-diene terpolymers.

8. The process of claim 7 wherein the elastomeric polyolefin is an ethylene-propylene copolymer rubber.

9. The process of claim 7 wherein the elastomeric polyolefin is polyisobutylene.

10. The process of claim 2 wherein the foamed and cross-linked polypropylene is formed, while still at elevated temperature, into a shaped article.

11. The process of claim 10 wherein the foamed and cross-linked polypropylene is formed into a flat sheet by pressing between parallel plates.

12. The process of claim 10 wherein the foamed and cross-linked polypropylene is formed into a three-dimensional shaped article by pressing in a matched set mold.

13. A process for preparing cellular polypropylene which comprises
    (1) heating in a closed mold a preformed composition comprising
        (a) polypropylene,
        (b) an azido cross-linking agent which decomposes at a temperature within the range of from the softening temperature of the composition to about 275° C.,
        (c) a blowing agent which yields at least one mole of gas per mole of blowing agent at a temperature within the range of from the softening temperature of the composition to about 275° C., said composition being heated to a temperature above the softening point of said composition and sufficient to release the gas from said blowing agent and to effect azido modification of said polypropylene,
    (2) reducing the pressure on the composition by opening the mold to allow free expansion at atmospheric pressure of the composition in all directions to retain essentially the preformed shape, and
    (3) while still at elevated temperature reducing the pressure on the foam of subatmospheric pressure to allow further expansion of the foam.

14. The process of claim 13 wherein the foamed and cross-linked polypropylene is formed into a shaped article.

References Cited

UNITED STATES PATENTS

| | | | |
|---|---|---|---|
| 2,271,498 | 1/1942 | Overstreet | 264—54 |
| 2,283,316 | 5/1942 | Cooper et al. | 264—55 |
| 2,297,018 | 9/1942 | Overstreet | 264—54 |
| 2,518,249 | 8/1950 | Ott | 260—2.5 |
| 2,532,243 | 11/1950 | Ott | 260—2.5 |
| 2,678,293 | 5/1954 | McMillan et al. | 260—2.5 |
| 2,768,407 | 10/1954 | Lindemann | 264—55 |
| 2,830,029 | 4/1958 | Adams | 260—2.5 |
| 2,927,904 | 3/1960 | Cooper | 260—2.5 |
| 2,948,664 | 8/1960 | Rubens et al. | 260—2.5 |
| 3,006,033 | 10/1961 | Knox | 264—54 |
| 3,017,371 | 11/1962 | Hohenberg et al. | 260—2.5 |
| 3,058,944 | 9/1962 | Breslow et al. | 260—2.5 |
| 3,137,745 | 6/1964 | Johnstone | 260—2.5 |
| 3,140,266 | 6/1964 | Peticolas | 260—2.5 |
| 3,250,730 | 5/1966 | Palmer | 260—2.5 |
| 3,250,731 | 5/1966 | Buhl et al. | 260—2.5 |

FOREIGN PATENTS 856,735  12/1960  Great Britain.

MURRAY TILLMAN, *Primary Examiner.*

M. FOELAK, *Assistant Examiner.*

UNITED STATES PATENT OFFICE
CERTIFICATE OF CORRECTION

Patent No. 3,341,481                          September 12, 1967

David A. Palmer

It is hereby certified that error appears in the above numbered patent requiring correction and that the said Letters Patent should read as corrected below.

Column 2, line 36, before "dichlorotetrafluoroethylene" insert -- monochlorodifluoromethane --; line 67, before "sulfonazido-methyl styrene" insert an opening parenthesis; column 3, line 33, for "diazide" read -- diazido --; line 34, for "2,6-diazide-" read -- 2,6-diazido- --; columns 5 and 6, TABLE I, ninth column, lines 2, 3 and 4, for "×1/2", each occurrence, read -- ×3/8 --; column 10, line 44, for "of" read -- to --.

Signed and sealed this 24th day of September 1968.

(SEAL)
Attest:

Edward M. Fletcher, Jr.
Attesting Officer

EDWARD J. BRENNER
Commissioner of Patents